(12) United States Patent
McKenney et al.

(10) Patent No.: US 7,934,062 B2
(45) Date of Patent: Apr. 26, 2011

(54) READ/WRITE LOCK WITH REDUCED READER LOCK SAMPLING OVERHEAD IN ABSENCE OF WRITER LOCK ACQUISITION

(75) Inventors: Paul E. McKenney, Beaverton, OR (US); Vaddagiri Srivatsa, Bangalore (IN); Gautham R. Shenoy, Karkala (IN)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 11/767,020

(22) Filed: Jun. 22, 2007

(65) Prior Publication Data
US 2008/0320262 A1 Dec. 25, 2008

(51) Int. Cl.
*G06F 13/00* (2006.01)
(52) U.S. Cl. .................... 711/147; 711/E12.023
(58) Field of Classification Search ............... None
See application file for complete search history.

(56) References Cited

U.S. PATENT DOCUMENTS

| | | | |
|---|---|---|---|
| 5,761,659 A | 6/1998 | Bertoni | |
| 6,219,690 B1 | 4/2001 | Slingwine et al. | |
| 6,601,120 B1 | 7/2003 | Schimmel | |
| 6,678,772 B2 | 1/2004 | McKenney | |
| 6,816,891 B1 | 11/2004 | Vahalia et al. | |
| 6,823,511 B1 | 11/2004 | McKenney et al. | |
| 2002/0078119 A1* | 6/2002 | Brenner et al. | 709/102 |
| 2002/0138706 A1 | 9/2002 | Hugly | |
| 2003/0200398 A1* | 10/2003 | Harris | 711/152 |
| 2003/0236957 A1 | 12/2003 | Miller et al. | |
| 2004/0143712 A1* | 7/2004 | Armstrong et al. | 711/152 |
| 2004/0181635 A1* | 9/2004 | Huras et al. | 711/151 |
| 2004/0255086 A1* | 12/2004 | Sengdan | 711/150 |
| 2005/0039049 A1 | 2/2005 | Chang et al. | |
| 2005/0114609 A1* | 5/2005 | Shorb | 711/152 |
| 2005/0149634 A1 | 7/2005 | McKenney | |
| 2006/0161741 A1* | 7/2006 | Yasue et al. | 711/152 |
| 2009/0044194 A1* | 2/2009 | Rathi | 718/104 |

OTHER PUBLICATIONS

Hsieh et al., "Scalable reader-writer locks for parallel systems," Parallel Processing Symposium,1992. Proceedings, Sixth International, pp. 656-659.
Bodorik et al., "Locking with different granularities for reads and writes in an MVM system," Database Engineering and Applications, 1999, IDEAS '99, International Symposium Proceedings, pp. 311-320.

(Continued)

*Primary Examiner* — Matt Kim
*Assistant Examiner* — Sean Rossiter
(74) *Attorney, Agent, or Firm* — Walter W. Duft (57) ABSTRACT

An improved reader-writer locking for synchronizing access to shared data. When writing the shared data, a writer flag is set and a lock is acquired on the shared data. The shared data may be accessed following the expiration of a grace period and a determination that there are no data readers accessing the shared data. When reading the shared data, the writer flag is tested that indicates whether a data writer is attempting to access the shared data. If the writer flag is not set, the shared data is accessed using a relatively fast read mechanism. If the writer flag is set, the shared data is accessed using a relatively slow read mechanism.

20 Claims, 10 Drawing Sheets

OTHER PUBLICATIONS

Krieger et al., "A Fair Fast Scalable Reader-Writer Lock," 1993, Proc. Intl., Conf. on Parallel Processing, Department of Electrical and Computer Engineering, University of Toronto, Canada, 4 pages.

McKenney, "Selecting locking primitives for parallel programming," Oct. 1996, Communications of the ACM, vol. 39, Issue 10, pp. 75-82.

Chen et al., "Asynchronous data sharing in multiprocessor real-time systems using process consensus," Jun. 1998, Real-Time Systems, Proceedings, 10th Euromicro Workshop, pp. 2-9.

Mellor-Crummey et al., Scalable Reader-Writer Synchronization for Shared-Memory Multiprocessors, 1991, pp. 106-113.

* cited by examiner

READ/WRITE LOCK WITH REDUCED READER LOCK SAMPLING OVERHEAD IN ABSENCE OF WRITER LOCK ACQUISITION

BACKGROUND OF THE INVENTION

1. Field of the Invention

The present invention relates to computer systems and methods in which data resources are shared among concurrent data consumers while preserving data integrity and consistency relative to each consumer. More particularly, the invention concerns an implementation of a mutual exclusion mechanism known as "reader-writer synchronization."

2. Description of the Prior Art

By way of background, reader-writer synchronization, also known as "reader-writer locking," is a mutual exclusion technique that is suitable for use in shared memory multiprocessor computing environments to protect a set of shared data. This form of locking allows read operations (readers) to share lock access in order to facilitate parallel data reads, but requires write operations (writers) to obtain exclusive lock access for writing the data. The technique is well suited to shared memory multiprocessor computing environments in which the number of readers accessing a shared data set is large in comparison to the number of writers, and wherein the overhead cost of requiring serialized lock acquisition for readers would be high. For example, a network routing table that is updated at most once every few minutes but searched many thousands of times per second is a case where serialized read-side locking would be quite burdensome.

Figure 1:
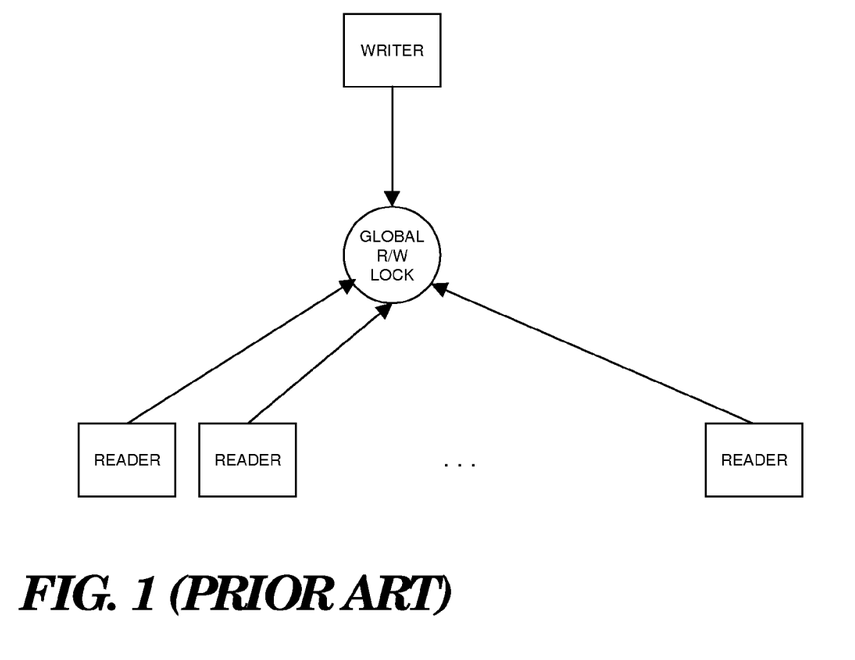
FIG. 1 is a diagrammatic representation of a conventional reader-writer lock implementation using a global reader-writer lock.
Figure 2:
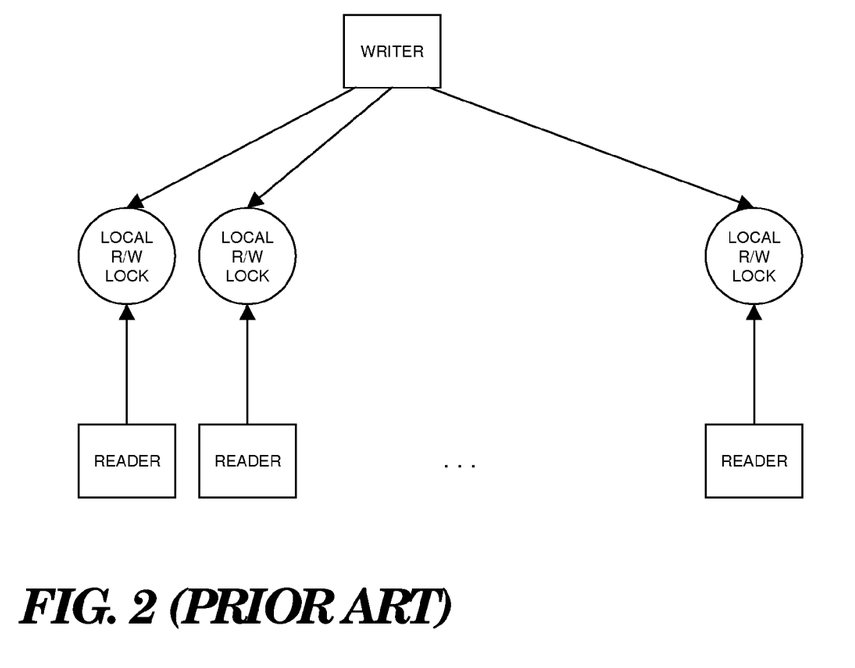
FIG. 2 is a diagrammatic representation of a conventional reader-writer lock implementation using a distributed reader-writer lock.

Reader-writer locks are conventionally implemented using either a single global lock that is shared among processors, or as a set of distributed per-processor locks. The global reader-writer lock approach is illustrated in FIG. 1. It requires readers and writers to contend for one global lock on an equal footing, but produces memory contention delays due to cache line bouncing of the lock between each processor's cache. Insofar as reader-writer locks are premised on the existence of a read-intensive processing environment, readers may be unduly penalized, especially if their critical sections are short and their lock acquisition frequency is high. The distributed reader-writer lock approach is illustrated in FIG. 2. It requires the readers to acquire only a local per-processor lock that will usually reside in the memory cache of the processor that hosts the acquiring reader. However, the writers must acquire all of the local locks, which degrades writer performance due to memory contention and in some cases due to new readers being allowed to starve a writer while the latter is waiting for one of the local locks.

A further disadvantage associated with either type of reader-writer locking is that lock acquisition imposes a burden on readers, even in the absence of a writer. Reader-writer locks are typically implemented as semaphores, mutex locks and spinlocks. Acquiring each of these lock types often imposes the cost of atomic instructions and/or memory barriers. In a read-mostly computing environment, the overhead associated with these operations falls mostly on readers.

It is to solving the foregoing problems that the present invention is directed. In particular, what is required is a reader-writer locking technique that is fair to writers yet which reduces the overhead associated with read-side lock acquisition.

SUMMARY OF THE INVENTION

The foregoing problems are solved and an advance in the art is obtained by a method, system and computer program product for implementing improved reader-writer locking for synchronizing access to shared data. When writing the shared data, a writer flag is set and a lock is acquired on the shared data. If desired, the lock acquisition can be effectuated by setting the writer flag. The shared data may be accessed following the expiration of a grace period and a determination that there are no data readers accessing the shared data. When reading the shared data, the writer flag is tested that indicates whether a data writer is attempting to access the shared data. If the writer flag is not set, the shared data is accessed using a relatively fast read mechanism. If the writer flag is set, the shared data is accessed using a relatively slow read mechanism.

The relatively fast read mechanism may comprise incrementing a reader reference counter prior to a data reader accessing the shared data, and decrementing the reader reference counter after the data reader accesses the shared data. The relatively slow read mechanism may comprise acquiring the lock prior to a data reader accessing the shared data and releasing the lock after the data reader accesses the shared data. If the writer flag is tested after the writer flag is set, the grace period will guarantee that a data reader will see the writer flag in a set condition. If the writer flag is tested before the writer flag is set, the grace period will guarantee that the incrementation or decrementation of the reader reference counter will complete prior to a determination being made that no data readers are accessing the shared.

BRIEF DESCRIPTION OF THE DRAWINGS

The foregoing and other features and advantages of the invention will be apparent from the following more particular description of exemplary embodiments of the invention, as illustrated in the accompanying Drawings, in which.

DETAILED DESCRIPTION OF EXEMPLARY EMBODIMENTS

Figure 3:
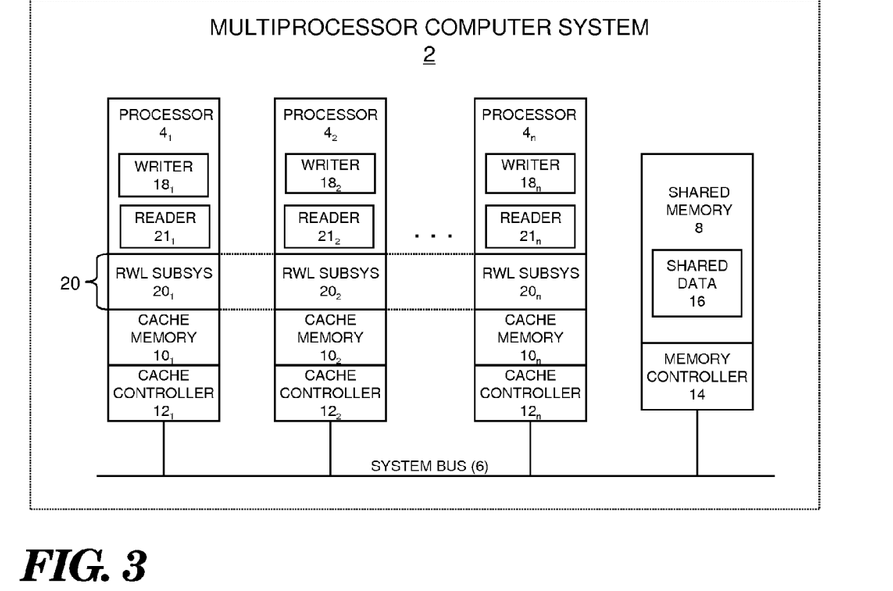
FIG. 3 is a functional block diagram showing a multiprocessor computing system that represents an exemplary environment in which reader-writer locking may be used.

Turning now to the figures, wherein like reference numerals represent like elements in all of the several views, FIG. 3 illustrates an exemplary computing environment in which the present invention may be implemented. In particular, a symmetrical multiprocessor (SMP) computing system 2 is shown in which multiple processors $4_1, 4_2 \ldots 4_n$ are connected by way of a common bus 6 to a shared memory 8. Respectively associated with each processor $4_1, 4_2 \ldots 4_n$ is a conventional cache memory $10_1, 10_2 \ldots 10_n$ and a cache controller $12_1, 12_2 \ldots 12_n$. A conventional memory controller 14 is associated with the shared memory 8. The computing system 2 is assumed to be under the management of a single multitasking operating system adapted for use in an SMP environment. In the alternative, a single processor computing environment could be used to implement the invention, as could a hardware multithreading environment, a multi-core environment and a NUMA (Non-Uniform Memory Access) environment, to name but a few.

It is further assumed that data write operations executed within kernel or user mode processes, threads, or other execution contexts will periodically perform updates on a set of shared data 16 stored in the shared memory 8. Reference numerals $18_1, 18_2 \ldots 18_n$ illustrate individual data write operations (writers) that may periodically execute on the several processors $4_1, 4_2 \ldots 4_n$. The updates performed by the writers $18_1, 18_2 \ldots 18_n$ can include modifying elements of a linked list, inserting new elements into the list, deleting elements from the list, and many other types of operations. Each of the processors $4_1, 4_2 \ldots 4_n$ also periodically executes read operations (readers) $21_1, 21_2 \ldots 21_n$ on the shared data 16. Such read operations will typically be performed far more often than updates, insofar as this is one of the premises underlying the use of read-writer locks. To facilitate synchronized reader-writer access to the shared data 16, the several processors $4_1, 4_2 \ldots 4_n$ are programmed to implement a read-writer locking (RWL) subsystem 20, as by periodically executing respective RWL instances $20_1, 20_2 \ldots 20_n$ as part of their operating system or user application functions. For reasons which will be described in more detail below, the RWL subsystem 20 includes a grace period processing mechanism that can be invoked by the writers $18_1, 18_2 \ldots 18_n$ to ensure that their RWL operations are synchronized with counterpart RWL operations performed by the readers $21_1, 21_2 \ldots 21_n$. The concept of a grace period is used extensively in a mutual exclusion technique known as "read-copy update." In the context of the present disclosure, the expiration of a grace period represents the point at which a writer $18_1, 18_2 \ldots 18_n$ can guarantee that all readers $21_1, 21_2 \ldots 21_n$ that were executing prior to the writer have completed execution.

Figure 4:
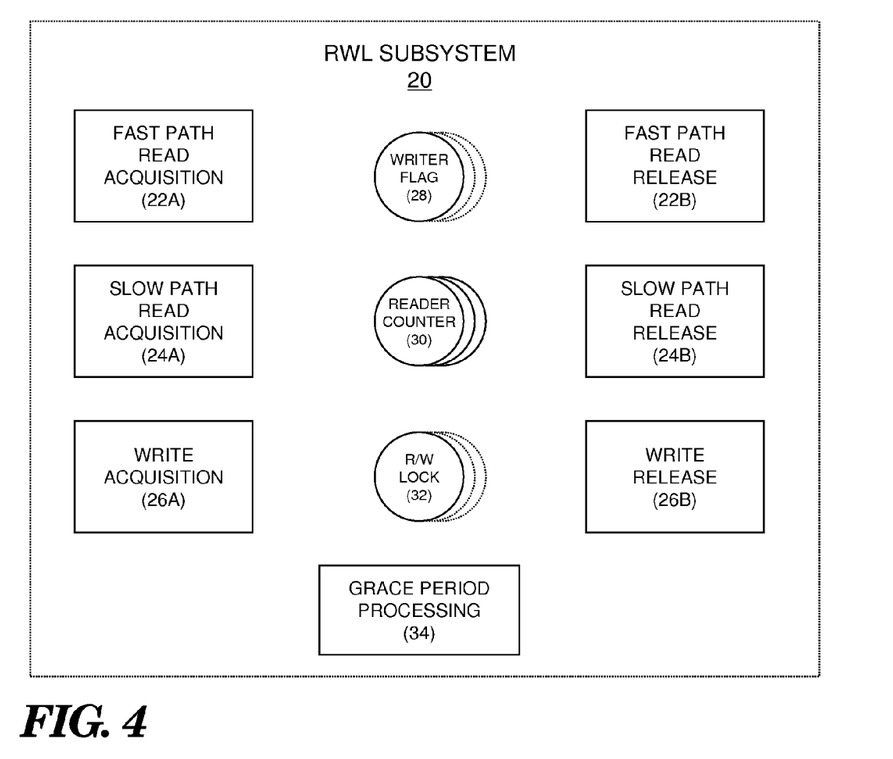
FIG. 4 is diagrammatic representations showing a reader-writer lock subsystem according to an exemplary reader-writer lock technique.

As shown in FIG. 4, the RWL subsystem 20 includes a set of primitives that serve as an RWL subsystem API (Application Program Interface) that can be called by the writers $18_1, 18_2 \ldots 18_n$ and the readers $21_1, 21_2 \ldots 21_n$ prior to and following critical section processing of the shared data 16. These primitives comprise fast path read acquisition logic 22A, fast path read release logic 22B, slow path read acquisition logic 24A, slow path read release logic 24B, write acquisition logic 26A and write release logic 26B. The operations of these primitives are described in detail below. The RWL subsystem 20 also provides one or more instances of a writer flag 28, a distributed set of per-processor reader reference counters 30 one or more instances of and a reader-writer (R/W) lock 32. As stated above, the RWL subsystem 20 further includes grace period processing logic 34.

Figure 5A:
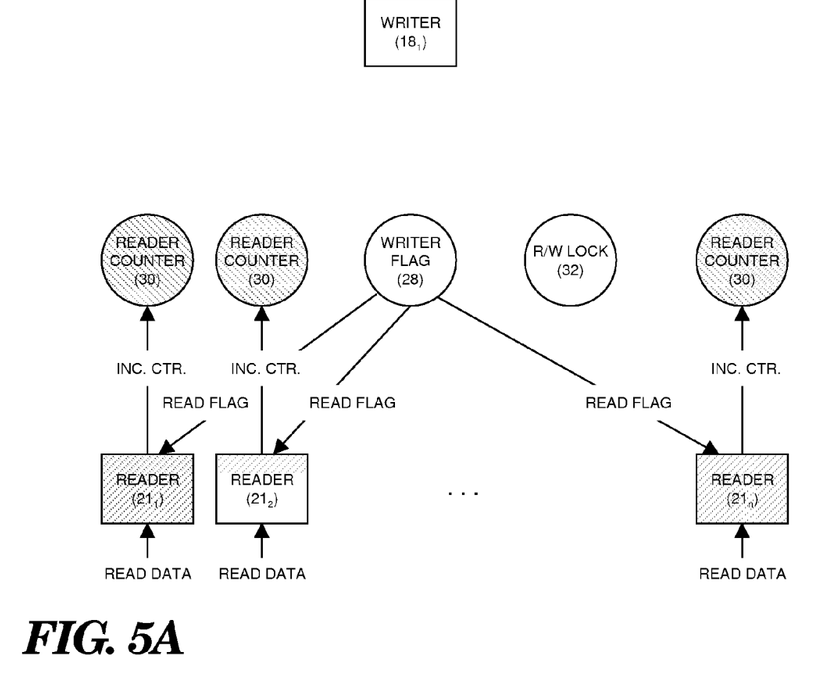
FIGS. 5A, 5B, 5C and 5D are diagrammatic representations showing read/write processing according to an exemplary reader-writer lock technique.

The RWL subsystem 20 supports improved reader-writer locking by reducing the overhead normally associated with read-side lock acquisition, which as described by way of background above, typically require costly memory barriers and atomic instructions. The RWL subsystem 20 allows the readers $21_1, 21_2 \ldots 21_n$ to access the shared data 16 via one of two locking routes, referred to herein as fast path read processing and slow path read processing. Fast path read processing is performed when there are no writers currently accessing or waiting to access to the shared data 16, as indicated by the writer flag 28. This mode of read processing requires no memory barriers or atomic instructions, only that the readers $21_1, 21_2 \ldots 21_n$ manipulate their local reader reference counter 30. Such processing is illustrated in FIG. 5A, wherein each of the readers $21_1, 21_2 \ldots 21_n$ have invoked the fast path read acquisition logic 22A to read the writer flag 28, determine that there are no writers present (e.g., the writer $18_1$), increment one of the local reader reference counters 30, and read the shared data 16. After completing their critical sections, the readers $21_1, 21_2 \ldots 21_n$ simply invoke the fast path read release logic 22B to decrement their local reader reference counter 30.

Figure 5B:
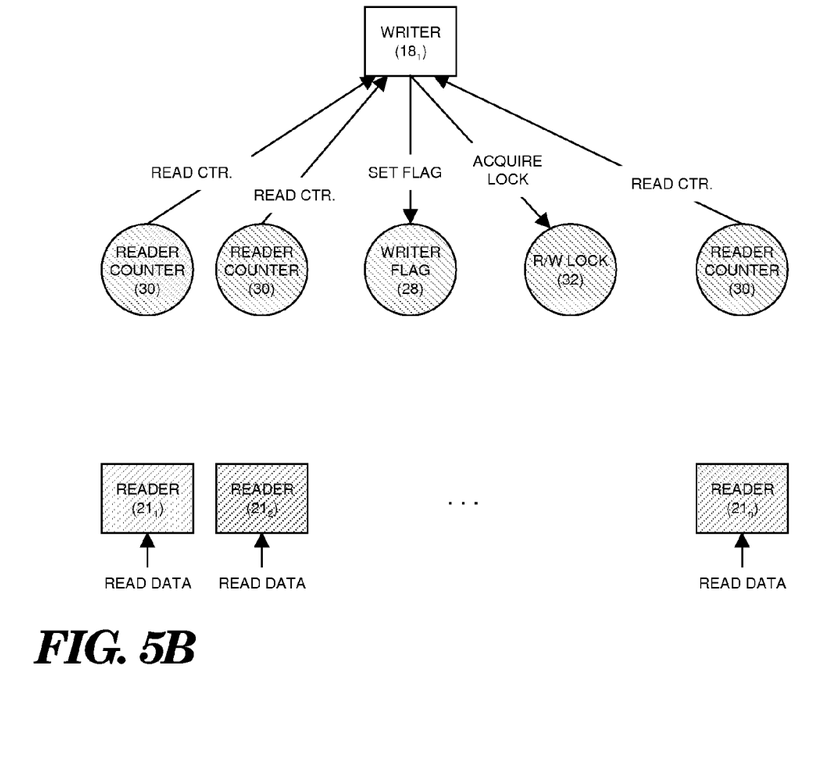
Figure 5C:
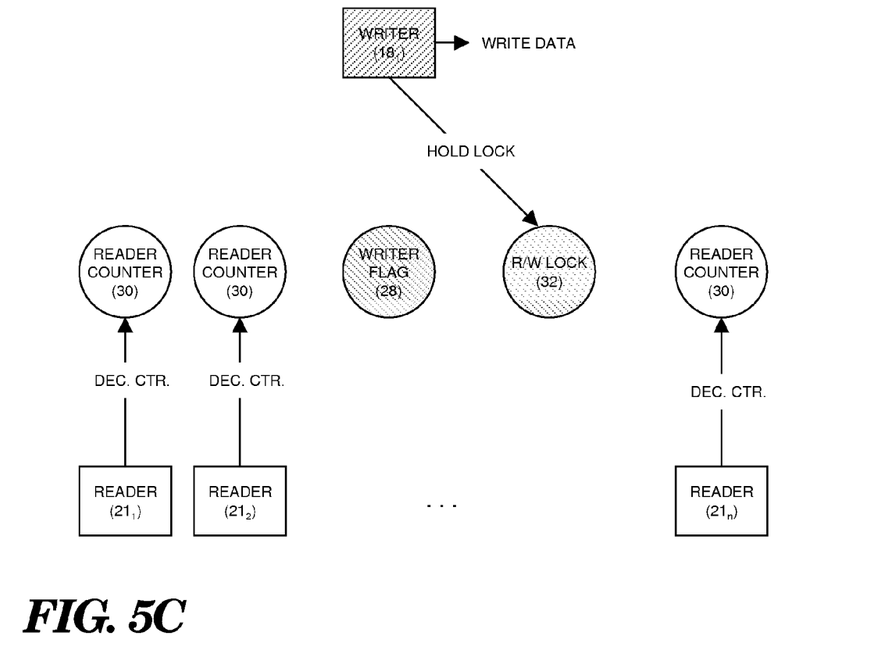

If one of the writers $18_1, 18_2 \ldots 18_n$ (e.g., the writer $18_1$) desires to update the shared data 16, it will invoke the write acquisition logic 26A to set the writer flag 28 and acquire the R/W lock 32. This condition is shown in FIG. 5B. Note that the writer flag 28 may itself be used as a write-side portion of the R/W lock 32. In an alternative implementation, the writer $18_1$ could be required to set the writer flag 28 and acquire the R/W lock 32 as a separate write-side lock entity. The write acquisition logic 26A then invokes the grace period processing logic 34 to track a grace period that ensures the readers $21_1, 21_2 \ldots 21_n$ will see the new write flag value. After the grace period has expired, the reader reference counters 30 are summed and tested for zero. As shown in FIG. 5C, once it is determined that a grace period has expired and the reader reference counters 30 have reached zero, the writer may enter its critical section and write the shared data 16.

Figure 5D:
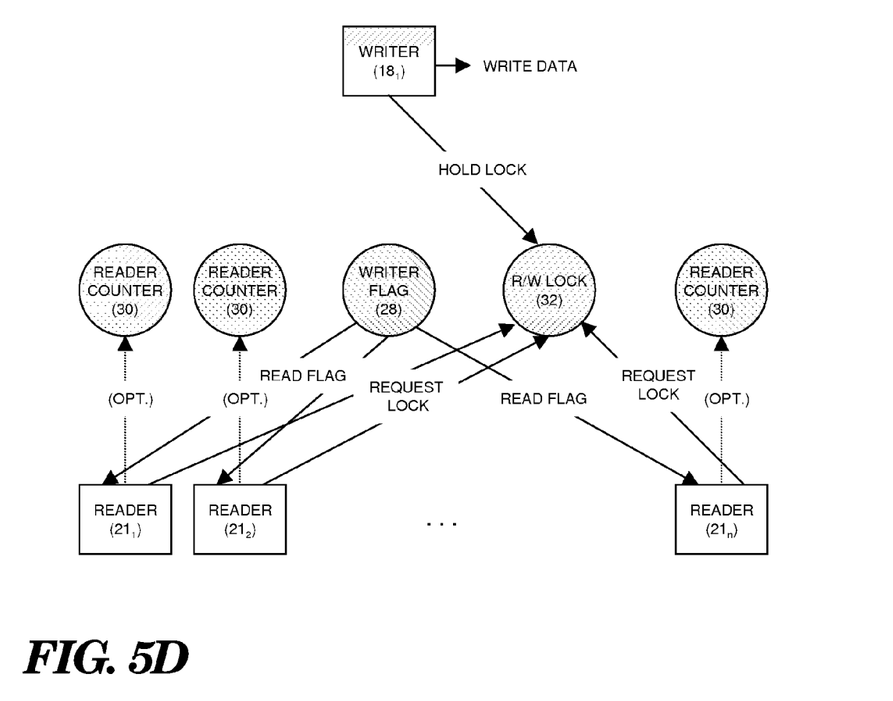

Only if the writer flag 28 is set will the readers perform conventional reader-writer locking. In particular, as shown in FIG. 5D, when the fast path read acquisition logic 22A finds the writer flag 28 set, it invokes the slow path read acquisition logic 24A, which requires the readers $21_1, 21_2 \ldots 21_n$ to acquire the R/W lock 32. The R/W lock 32 will prevent the readers $21_1, 21_2 \ldots 21_n$ from reading the shared data 16 until the writer $18_1$ has completed its critical section. As further shown in FIG. 5D, the slow path read acquisition logic 24A may also optionally increment the reader reference counters 30. Thereafter, when readers $21_1, 21_2 \ldots 21_n$ have read the shared data 16 and leave their critical sections, the slow path read release logic 24B will be called to release the R/W lock 32. The reader reference counters will also be decremented if they were incremented by the slow path read acquisition logic 24A, or by the fast path read acquisition logic 22A in the event that a writer $18_1, 18_2 \ldots 18_n$ set the writer flag 28 while the counter was incremented (see below).

If desired, the writer flag 28 could be implemented as a distributed set of local per-processor variables, which can be advantageous for the readers $21_1, 21_2 \ldots 21_n$ on NUMA systems. However, this requires more work for the writers $18_1, 18_2 \ldots 18_n$ due to having to write each write flag instance. Implementing the writer flag 28 as a global variable in the manner described above resolves this issue and will not normally delay fast path read processing by the readers $21_1, 21_2 \ldots 21_n$. This is due to the fact that the writer flag 28 will only be updated infrequently by the writers $18_1, 18_2 \ldots 18_n$, such that its value will tend to stay localized in the cache memories $10_1, 10_2 \ldots 10_n$ as a result of conventional operations of the cache controllers $12_1, 12_2 \ldots 12_n$. The reader reference counters 30 could potentially be implemented as a single global variable. However, because it is written during fast path read processing by the readers $21_1, 21_2 \ldots 21_n$ delays in such processing can be minimized if the reader reference counter 30 is implemented as described above, namely, as a distributed set of per-processor local variables. As a result of conventional operations of the cache controllers $12_1$, $12_2$ ... $12_n$, these local variables will tend to be maintained in each of the cache memories $10_1$, $10_2$ ... $10_n$ associated with one of the readers $21_1$, $21_2$ ... $21_n$. The R/W lock 32 could be implemented as a distributed set of local per-processor variables. However, this requires more work for the writers $18_1$, $18_2$ ... $18_n$ due to having to manipulate each R/W lock instance. Implementing the R/W lock 32 as a single global variable resolves this issue and will not unduly impact the readers $21_1$, $21_2$ ... $21_n$ because they will normally use fast path read processing given the infrequency of write operations.

Figure 6:
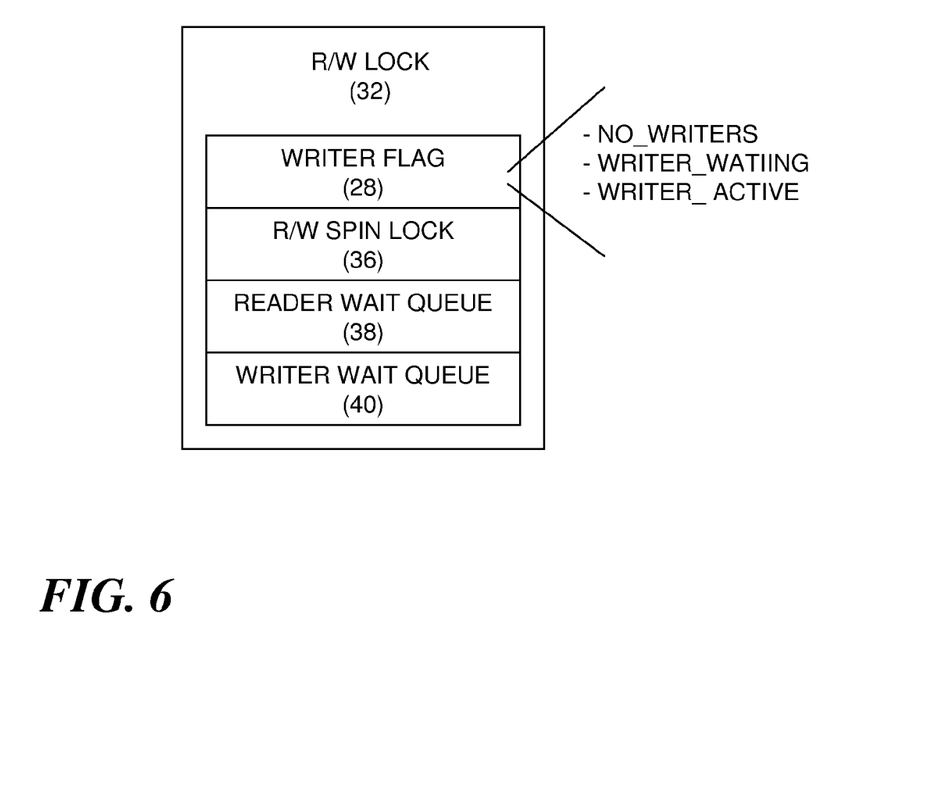
FIG. 6 is a diagrammatic representation of exemplary reader-writer lock data that may be used to implement an exemplary reader-writer lock technique.

Details of an exemplary implementation of the foregoing reader-writer locking technique will now be described with reference to FIGS. 6-10B. As shown in FIG. 6, the R/W lock 32 may be implemented as a data structure that comprises several elements. By way of example only, these elements may include the writer flag 28, an R/W spin lock (36) to protect the data structure, a reader wait queue (38) for queuing readers $21_1$, $21_2$ ... $21_n$ waiting for the R/W lock 32, and a writer wait queue (40) for queuing writers $18_1$, $18_2$ ... $18_n$ waiting for the R/W lock. The writer flag 28 may be set to one of three values. A value of 0x0000 represents a NO_WRITERS state and means that the writer flag 28 is cleared. A value of 0x0001 represents a WRITER_WAITING state and means that the writer flag 28 is set because a writer is waiting for the R/W lock 32. A value of 0x0002 represents a WRITER_ACTIVE state and means that the writer flag 28 is set because a writer owns the R/W lock 32. It should be noted that the indicated values 0x0000, 0x0001 and 0x0002 are for the purpose of illustration only, and that other values may also be used to represent the state of the writer flag 28.

Figure 7:
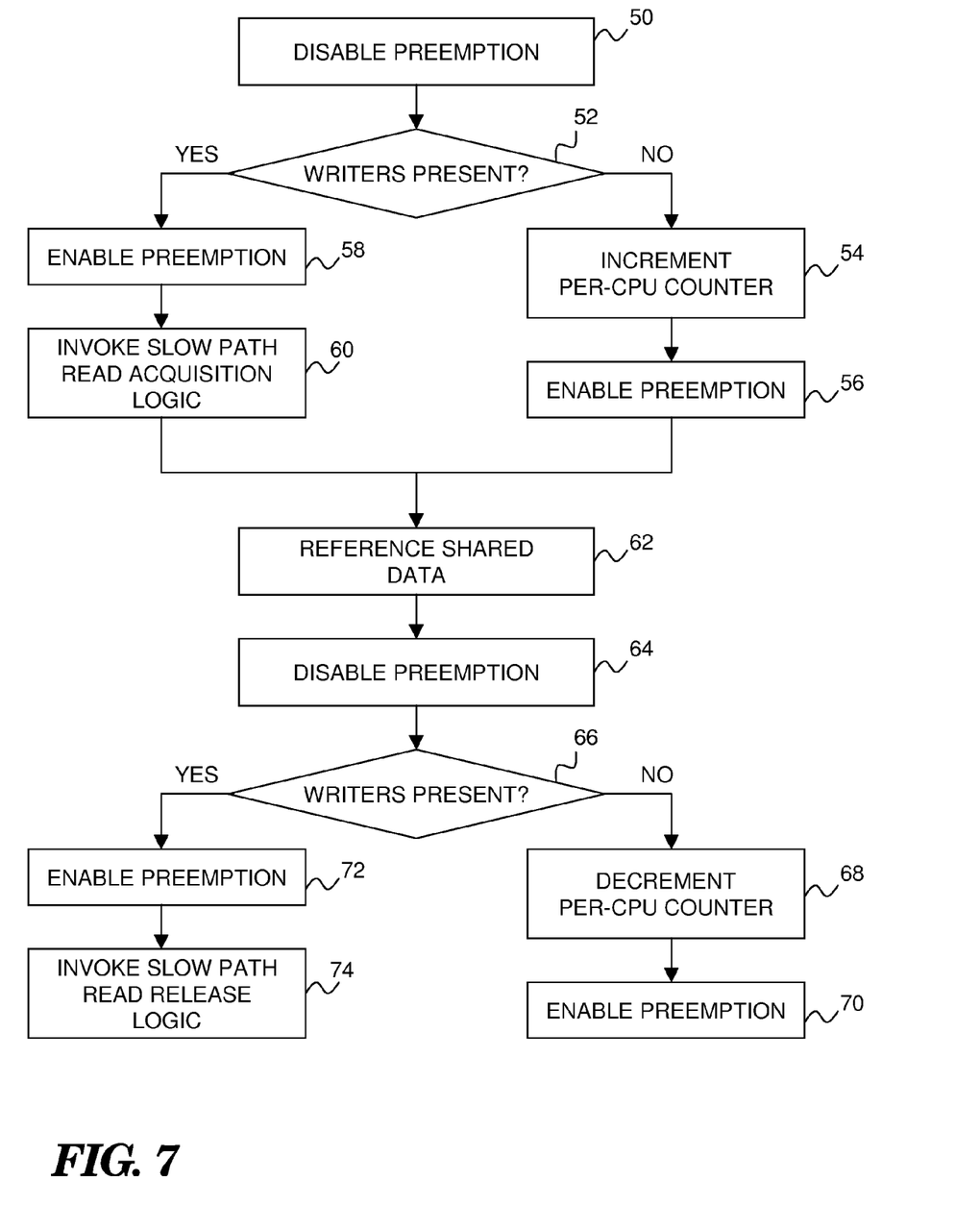
FIG. 7 is a flow diagram showing exemplary fast path read processing.

FIG. 7 illustrates exemplary processing that may be performed by the fast path read acquisition logic 22A (blocks 50-60) and the fast path read release logic 22B (blocks 64-74). In blocks 50 and 52, preemption is disabled in order to prevent disruption of the read acquisition operation (which is relatively fast) and the writer flag 28 is tested to determine if any writers $18_1$, $18_2$ ... $18_n$ are present (i.e. whether the writer flag 28 is set due to either a WRITER_WAITING or WRITER_ACTIVE state). If the writer flag 28 is not set, the reader reference counter 30 associated with the current reader $21_1$, $21_2$ ... $21_n$ is incremented (block 54) and preemption is re-enabled to restore normal preemptable operation (block 56). If the writer flag 28 is set, preemption is re-enabled (block 58) and the slow path read acquisition logic 24A is invoked (block 60). Following blocks 56 or 60, the reader enters its critical section in block 62 and references the shared data 16. The operations of blocks 64-74 are then performed in order to gracefully exit the reader critical section by decrementing the reader reference counter 30 that was incremented in block 54 or, if a writer is now present and requesting access to the shared data 16, by invoking the slow patch read release logic 24B. In blocks 64 and 66, preemption is disabled and the writer flag 28 is tested to determine if any writers $18_1$, $18_2$ ... $18_n$ are present (i.e. whether the writer flag 28 is set due to either a WRITER_WAITING or WRITERS_ACTIVE state). If the writer flag 28 is not set, the reader reference counter 30 associated with the current reader $21_1$, $21_2$ ... $21_n$ is decremented (block 68) and preemption is re-enabled (block 70). If the writer flag 28 is set, preemption is re-enabled (block 72) and the slow path read release logic 24B is invoked (block 74).

Figure 8:
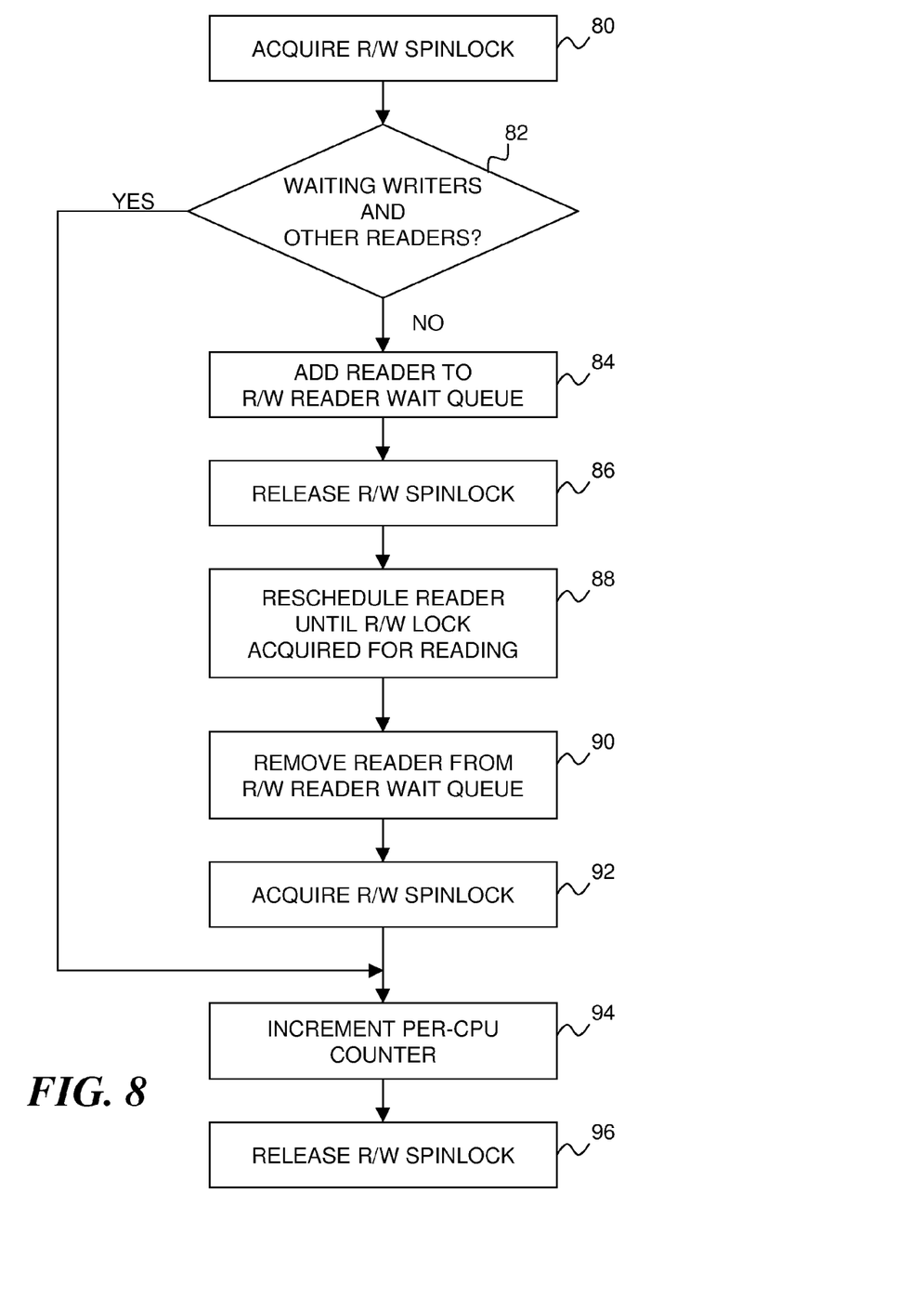
FIG. 8 is a flow diagram showing exemplary slow path read lock acquisition.

FIG. 8 illustrates exemplary processing that may be performed by the slow path read acquisition logic 24A (blocks 80-98). In block 80, the R/W spinlock 36 guarding the R/W lock 32 is acquired. In block 82, a test is made to determine if the writer flag 28 is set to the WRITER_WAITING state, and if any reader reference counter 30 for other readers $21_1$, $21_2$ ... $21_n$ is incremented. If not, the current reader $21_1$, $21_2$ ... $21_n$ is added to the R/W lock's reader wait queue 38 (block 84) and the R/W spinlock 36 is released (block 86). In block 88, the reader $21_1$, $21_2$ ... $21_n$ is rescheduled until the R/W lock 32 can be acquired for reading. When this occurs, the reader $21_1$, $21_2$ ... $21_n$ is removed form the R/W lock's reader wait queue 38 (block 90) and the R/W spinlock 36 is again acquired (block 92). In block 94, the reader reference counter 30 associated with the current reader $21_1$, $21_2$ ... $21_n$ is incremented and the R/W spinlock 36 is released in block 96. Block 94 is also reached if the test in block 82 produces a true result because there are writers $18_1$, $18_2$ ... $18_n$ in the WRITER_WAITING state and other readers $21_1$, $21_2$ ... $21_n$ whose reader reference counter 30 is set. This condition is used as an invitation to resume fast path read acquisition processing, the idea being to favor the current reader $21_1$, $21_2$ ... $21_n$ over the waiting writer(s) $18_1$, $18_2$ ... $18_n$ by allowing the reader to join with the other readers that are already reading the shared data 16. Note that this operation may tend to starve the waiting writer(s) $18_1$, $18_2$ ... $18_n$ and thus may not be desirable in all cases.

Figure 9:
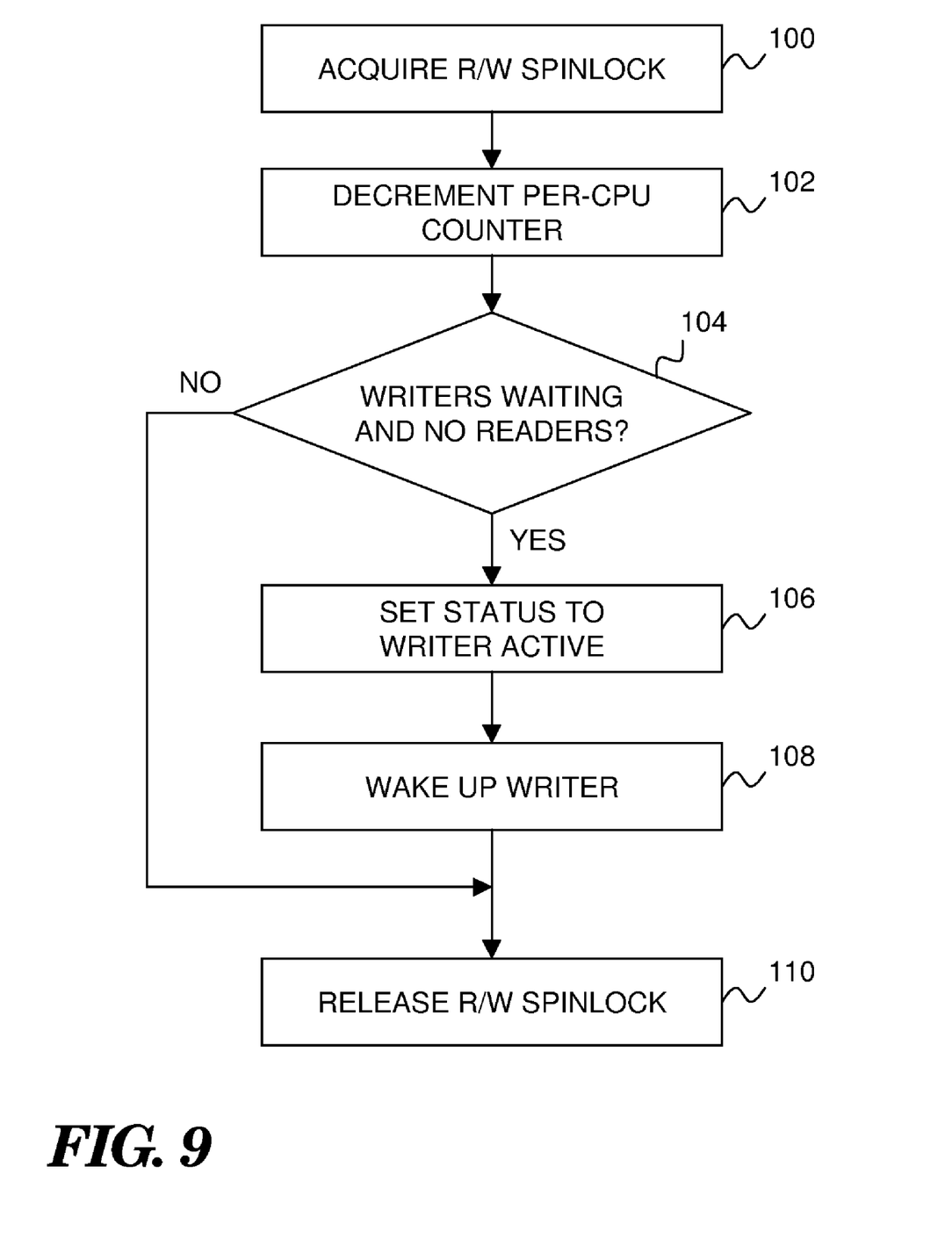
FIG. 9 is a flow diagram showing exemplary slow path read lock release.

FIG. 9 illustrates exemplary processing that may be performed by the slow path read release logic 24B (blocks 100-110). In blocks 100 and 102, the R/W spinlock 36 guarding the R/W lock 32 is acquired and the reader reference counter 30 associated with the current reader $21_1$, $21_2$ ... $21_n$ is decremented (having been previously incremented in block 96 of the slow path read acquisition processing or in block 54 of the fast path read acquisition processing 22A (the latter in the case where a writer $18_1$, $18_2$ ... $18_n$ arrived after the reader performed the block 54 counter incrementation but before it tested the writer flag 28 in block 66). In block 104, a check is made to determine if there are any writers $18_1$, $18_2$ ... $18_n$ waiting in the R/W writer wait queue 40 for the R/W lock 32 and if there are no other readers $21_1$, $21_2$ ... $21_n$ who have incremented their reader reference counter 30. If this condition holds true, the writer flag 28 is set to the WRITER_ACTIVE state (block 106) and the next writer $18_1$, $18_2$ ... $18_n$ waiting in the R/W writer wait queue 40 is awoken (block 108). The R/W spinlock 36 is then released in block 110. Block 110 is also reached if the test in block 104 returns false.

Figure 10A:
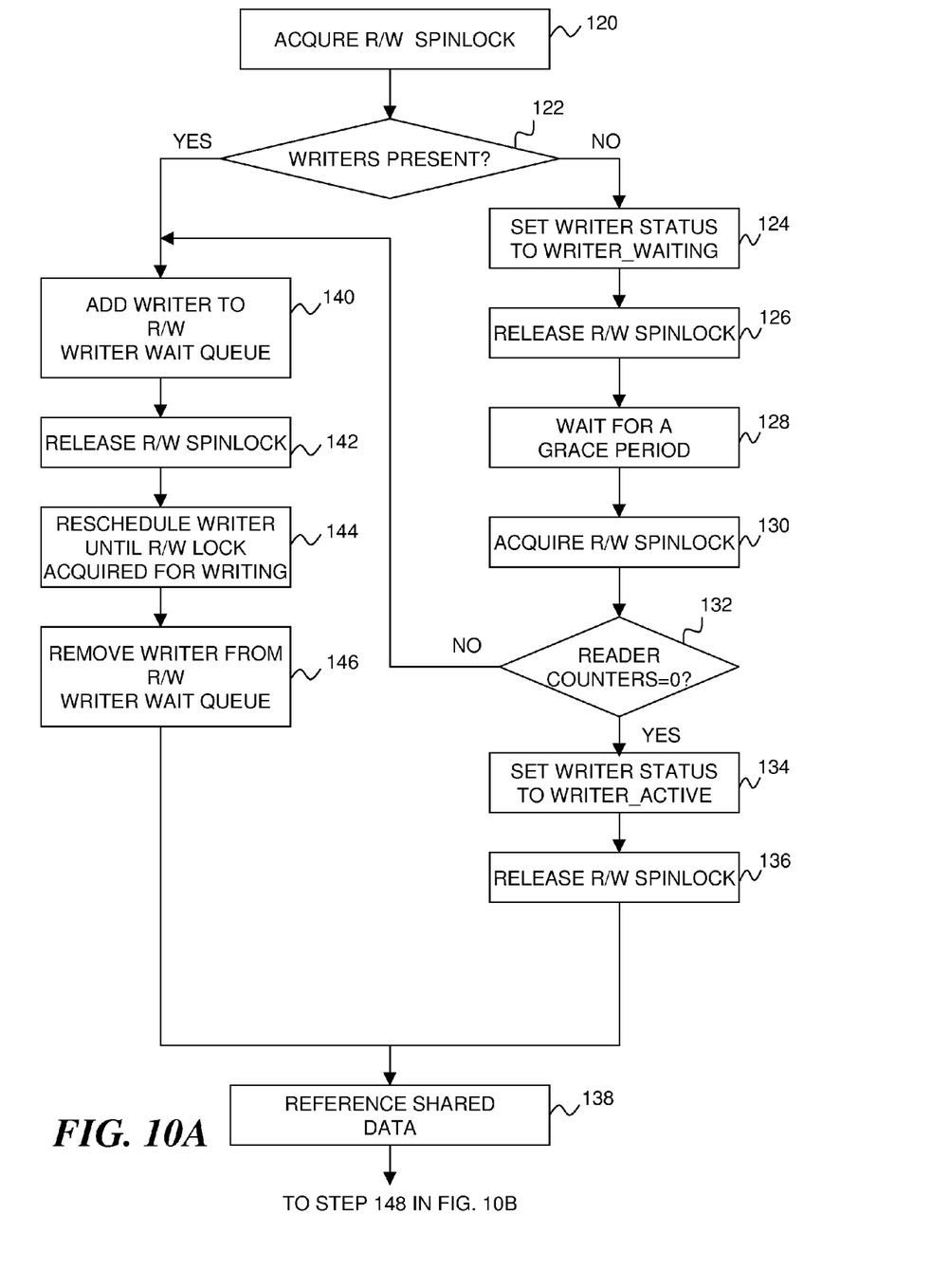
FIGS. 10A and 10B are a flow diagram showing exemplary write processing.
Figure 10B:
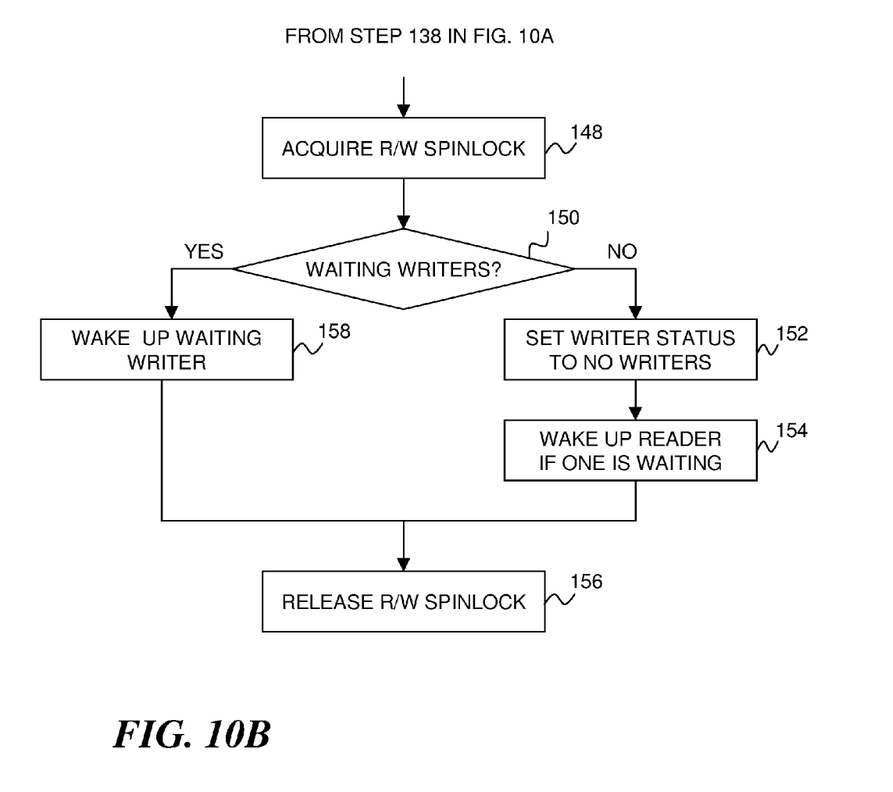

FIGS. 10A and 10B collectively illustrate exemplary processing that may be performed by the write acquisition logic 26A (blocks 120-148) and the write release logic 26B (blocks 150-160). In block 120 of FIG. 10A, the R/W spinlock 36 guarding the R/W lock 32 is acquired. In block 122, a test is made to determine if any writers $18_1$, $18_2$ ... $18_n$ are present (i.e. whether the writer flag 28 is set due to either a WRITER_WAITING or WRITERS_ACTIVE state). If not, the write flag 28 is set to the WRITER_WAITING state in block 124 and the R/W spinlock is released in block 126. In block 128, the grace period processing logic 34 is invoked to await the expiration of a grace period. The grace period guarantees that all new readers $21_1$, $21_2$ ... $21_n$ invoked following the current write acquisition processing will see the changed status of the writer flag 28 and thereby allow them to perform slow path read acquisition processing. The grace period processing logic 34 thus effects a memory barrier that allows the updated writer flag 28 to be seen on all processors $4_1$, $4_2$ ... $4_n$ before the write acquisition processing logic 26A proceeds. The grace period will also guarantee that older readers $21_1$, $21_2$ ... $21_n$ invoked prior to the current write acquisition processing have finished incrementing or decrementing their reader reference counters 30 before the write acquisition logic 26A proceeds. This represents a quiescent state in which the older readers $21_1, 21_2 \ldots 21_n$ will have finished manipulating (incrementing or decrementing) their reader reference counters 30. One mechanism that may be used to implement the grace period processing logic 34 is the "synchronize_sched( )" primitive provided by conventional read-copy update implementations. This primitive is designed for grace period processing to protect processes that run non-preemptively (e.g., with preemption disabled), which is the case for the fast path read acquisition logic 22A and the fast path read release logic 22B. Following the expiration of a grace period in block 128, the R/W spinlock 36 is acquired in block 130 and a test is made in block 132 to determine if the reader reference counters 30 are all zero. If they are, the writer flag 28 is set to the WRITER_ACTIVE state (block 134), and the R/W spinlock is released (block 136). The block 134 operation effects acquisition of the R/W lock 32 by the current writer $18_1, 18_2 \ldots 18_n$. The writer $18_1, 18_2 \ldots 18_n$ may then enter its critical section to write the shared data 16 in block 138.

If it is determined in block 122 that there are other writers present, or if the reader reference counters 36 are not zero in block 132, block 140 is implemented and the current writer $18_1, 18_2 \ldots 18_n$ is added to the R/W lock's writer wait queue 40. After the R/W spinlock 36 is released (block 142), the writer is rescheduled until the R/W lock 32 can be acquired for writing (block 144) and the writer $18_1, 18_2 \ldots 18_n$ is removed from the R/W lock's writer wait queue 40 (block 146).

In block 148 of FIG. 10B, the R/W spinlock 36 is acquired and in block 150 the R/W lock's writer wait queue 40 is checked for waiting writers. If there are none, the writer flag 28 is placed in the NO_WRITERS state (block 152) and the next reader $21_1, 21_2 \ldots 21_n$ on the R/W reader wait queue 38, if present, is woken up (block 154). The R/W spinlock 36 is then released in block 156. If there are writers $18_1, 18_2 \ldots 18_n$ waiting on the writer wait queue 40 in block 150, the next writer on this queue is woken up (block 158) and the R/W spinlock is released (block 156).

In a variation of the foregoing reader-writer locking technique, provision can be made for the readers $21_1, 21_2 \ldots 21_n$ to read the shared data 16 recursively. By way of example, a recursive read operation can arise when nested data structures are accessed (e.g., an RWL-protected list pointed to by another RWL-protected list). Another scenario is when an interrupt occurs while a process is performing a read operation on RWL-protected data, and the interrupt service routine also performs a read operation on RWL-protected data. When such recursion occurs, the fact that the reader $21_1, 21_2 \ldots 21_n$ is operating recursively can be tracked by using a per-task counter for each reader that is incremented each time a recursive read operation is performed and decremented each time a recursive read operation completes.

In a further variation of the foregoing reader-writer locking technique, provision can be made for a writer $18_1, 18_2 \ldots 18_n$ to wait for a grace period before exiting its critical section in order to ensure that readers will see the writer's critical section updates. This may be desirable when the writer $18_1, 18_2 \ldots 18_n$ changes the writer flag 28 (block 152) or wakes up another writer (block 158) without first implementing a memory ordering instruction, such as occurs when the writer acquires the R/W spinlock 36 (block 148) protecting the R/W lock 32.

In a still further variation of the foregoing reader-writer locking technique based on conventional read-copy update primitives, the fast path read acquisition logic 22A could be implemented using the rcu_read_lock( ) primitive (which increments a counter without disabling preemption) and the fast path read release logic 22B could be implemented by the rcu_read_unlock( ) primitive (which decrements the counter incremented by rcu_read_lock( )). Instead of using the synchronize_sched( ) primitive to implement the grace period processing logic 34, this logic could be implemented by synchronize_rcu( ), which is designed to be used in conjunction with rcu_read_lock( ) and rcu_read_unlock( ).

Figure 11:
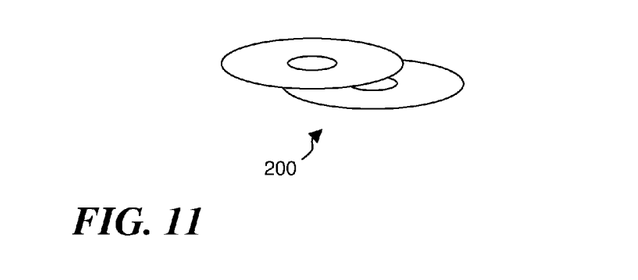
FIG. 11 is a diagrammatic illustration of media that can be used to provide a computer program product for implementing a reader-writer lock technique.

Accordingly, an improved reader-writer locking technique has been disclosed that allows readers to access shared data with minimal overhead in the absence of a writer contending for the same data. It will be appreciated that the foregoing concepts may be variously embodied in any of a data processing system, a machine implemented method, and a computer program product in which programming means are provided by one or more machine-readable media for use in controlling a data processing system to perform the required functions. Exemplary machine-readable media for providing such programming means are shown by reference numeral 200 in FIG. 11. The media 100 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the programming means of the invention, either alone or in conjunction with another software product that incorporates the required functionality. The programming means could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical, electromagnetic, infrared, semiconductor system or apparatus or device, transmission or propagation medium or signal, or other entity that can contain, store, communicate, propagate or transport the programming means for use by or in connection with a data processing system, computer or other instruction execution system, apparatus or device. It will also be appreciated that the invention may be embodied in a combination of hardware logic and software elements, and that the software elements may include but are not limited to firmware, resident software, microcode, etc.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for synchronizing access to shared data, comprising:

when reading said shared data is performed by a data reader:
said data reader testing a writer flag that indicates whether a separate data writer is attempting to access said shared data;
said data reader accessing said shared data using a fast read mechanism if said writer flag is not set, said fast read mechanism including said data reader performing an indicating action prior to reading said shared data that indicates to data writers desiring to access said shared data that said data reader has initiated accessing said shared data using said fast read mechanism; and said data reader accessing said shared data using a slow read mechanism if said writer flag is set, said slow read mechanism including said data reader waiting for a data writer to complete its access to said shared data; and when writing said shared data is performed by a data writer:

said data writer setting said writer flag;

following said writer flag setting, said data writer waiting for expiration of a grace period in which all executing instances of said data reader have an opportunity to either see said writer flag and initiate said slow read mechanism or complete said indicating action indicating that said data reader has initiated said fast read mechanism;

following said grace period expiration, said data writer waiting until there are no data readers accessing said shared data using said fast read mechanism;

following said waiting until there are no data readers, said data writer acquiring a lock on said shared data, said lock being different from said writer flag; and said data writer accessing said shared data.

2. A method in accordance with claim 1 wherein said fast read mechanism comprises said data reader incrementing a reader reference counter prior to a data reader accessing said shared data and decrementing said reader reference counter after said data reader accesses said shared data, said incrementing a reader reference counter representing said indicating action.

3. A method in accordance with claim 1 wherein said slow read mechanism comprises said data reader waiting for read access prior to said data reader accessing said shared data and thereafter enabling a waiting data writer if there are no other waiting data readers.

4. A method in accordance with claim 1 wherein said grace period guarantees that said writer flag will be seen in a set condition if said writer flag is tested after said writer flag is set.

5. A method in accordance with claim 2 wherein said grace period guarantees that said incrementing of said reader reference counter will complete prior to said data writer determining that no data readers are accessing said shared data if said writer flag is tested before said writer flag is set.

6. A method in accordance with claim 1 wherein said writer flag is settable to a no_writers condition indicating that no data writers currently have or are waiting for exclusive write access to said shared data, a writer_waiting condition indicating that one or more data writers are waiting for exclusive write access to said shared data, and a writer_active condition indicating that a data writer has exclusive access to said shared data, and wherein acquiring said lock is effectuated by said data writer setting said writer flag to said writers_active condition.

7. A method in accordance with claim 6 wherein said lock comprises a writer wait queue for said data writers to wait for exclusive write access to said shared data when said writer flag is in said writer_waiting condition, said writer wait queue being used to identify said waiting data writers in order for an eligible one of said waiting data writers to be enabled for exclusive write access to said shared data by another writer completing its writing of said shared data or by a reader completing its reading of said shared data using said slow read mechanism, and wherein said lock further comprises a reader wait queue for data readers to wait for read access to said shared data, said reader wait queue being used to identify an eligible one of said waiting data readers to be enabled for read access to said shared data by a data writer completing its writing of said shared data and setting said writer flag to said no_writers condition.

8. A data processing system having one or more processors, a memory and a communication pathway between the one or more processors and the memory, said system being adapted to synchronize access to shared data, and comprising:

a writer flag settable by a data writer that indicates whether said data writer is attempting to access said shared data;

fast path read logic executed by a data reader and adapted to coordinate fast reader access to said shared data on behalf of said data reader when said writer flag is not set by said data writer, said fast reader access including said data reader performing an indicating action prior to reading said shared data that indicates to data writers desiring to access said shared data that said data reader has initiated accessing said shared data using said fast read access;

slow path read logic executed by said data reader and adapted to coordinate slow reader access to said shared data on behalf of said data reader when said writer flag is set, said slow reader access including said data reader waiting for a data writer to complete its access to said shared data;

first write logic executed by said data writer and adapted to set said writer flag;

grace period processing logic executed by said data writer and adapted to implement a grace period following said writer flag being set by said data writer;

second write logic executed by said data writer after said first write logic and adapted to wait for expiration of said grace period in which all executing instances of said data reader have an opportunity to either see said writer flag and initiate said slow path read logic or complete said indicating action of said fast path read logic;

third write logic executed by said data writer after said second write logic and adapted to wait until there are no data readers accessing said shared data using said fast path read logic; and fourth write logic executed by said data writer after said third write logic and adapted to acquire a lock on said shared data on behalf of said data writer, said lock being different from said writer flag.

9. A system in accordance with claim 8 wherein said fast read logic is adapted to increment a reader reference counter prior to said data reader accessing said shared data and to decrement said reader reference counter after said data reader accesses said shared data, said increment of said reader reference counter representing said indicating action.

10. A system in accordance with claim 8 wherein said slow read logic is adapted to wait for read access prior to accessing said shared data and thereafter enable a waiting data writer if there are no other waiting data readers.

11. A system in accordance with claim 8 wherein said grace period guarantees that said data reader will see said writer flag in a set condition if said data reader tests said writer flag after said writer flag is set.

12. A system in accordance with claim 9 wherein said grace period guarantees that said incrementation of said reader reference counter will complete prior to said second write logic determining that no data readers are accessing said shared data if said writer flag is tested before said writer flag is set.

13. A system in accordance with claim 8 wherein said writer flag is settable to a no_writers condition indicating that no data writers currently have or are waiting for exclusive write access to said shared data, a writer_waiting condition indicating that one or more data writers are waiting for exclusive write access to said shared data, and a writer_active condition indicating that a data writer has exclusive access to said shared data, and wherein acquiring said lock is effectuated by said data writer setting said writer flag to said writers_active condition.

14. A computer program product for synchronizing access to shared data, comprising:
one or more non-transitory machine-readable media;
program instructions provided by said one or more media for programming a data processing platform to operate as by:
when reading said shared data is performed by a data reader:
said data reader testing a writer flag that indicates whether a separate data writer is attempting to access said shared data;
said data reader accessing said shared data using a fast read mechanism if said writer flag is not set, said fast read mechanism including said data reader performing an indicating action prior to reading said shared data that indicates to data writers desiring to access said shared data that said data reader has initiated accessing said shared data using said fast read mechanism; and
said data reader accessing said shared data using a slow read mechanism if said writer flag is set, said slow read mechanism including said data reader waiting for a data writer to complete its access to said shared data; and
when writing said shared data is performed by a data writer:
said data writer setting said writer flag;
following said writer flag setting, said data writer waiting for expiration of a grace period in which all executing instances of said data reader have an opportunity to either see said writer flag and initiate said slow read mechanism or complete said indicating action of indicating that said data reader has initiated said fast read mechanism;
upon expiration of said grace period, said data writer waiting until there are no data readers accessing said shared data using said fast read mechanism;
following said waiting until there are no data readers, said data writer acquiring a lock on said shared data, said lock being different from said writer flag; and
said data writer accessing said shared data.

15. A computer program product in accordance with claim 14 wherein said fast read mechanism comprises incrementing a reader reference counter prior to a data reader accessing said shared data and decrementing said reader reference counter after said data reader accesses said shared data, said incrementing a reader reference counter representing said indicating action.

16. A computer program product in accordance with claim 14 wherein said slow read mechanism comprises said data reader waiting for read access prior to a data reader accessing said shared data and thereafter enabling a waiting data writer if there are no other waiting data readers.

17. A computer program product in accordance with claim 14 wherein said grace period guarantees that said writer flag will be seen in a set condition if said writer flag is tested after said writer flag is set.

18. A computer program product in accordance with claim 15 wherein said grace period guarantees that said incrementing of said reader reference counter will complete prior to said data writer determining that no data readers are accessing said shared data if said writer flag is tested before said writer flag is set.

19. A computer program product in accordance with claim 14 wherein said writer flag is settable to a no_writers condition indicating that no data writers currently have or are waiting for exclusive write access to said shared data, a writer_waiting condition indicating that one or more data writers are waiting for exclusive write access to said shared data, and a writer_active condition indicating that a data writer has exclusive access to said shared data, and wherein acquiring said lock is effectuated by said data writer setting said writer flag to said writers_active condition.

20. A computer program product for synchronizing access to shared data, comprising:
one or more non-transitory machine-readable media;
program instructions provided by said one or more media for programming a data processing platform to operate as by:
a data writer setting a writer flag;
following said writer flag setting, said data writer waiting for expiration of a grace period in which all executing instances of a data reader of said shared data have an opportunity to either see said writer flag and initiate a slow read mechanism or perform a fast read mechanism indicating action that indicates to a data writer desiring to access said shared data that said data reader has initiated accessing said shared data using said fast read mechanism;
following said grace period expiration, said data writer waiting until there are no data readers accessing said shared data;
following said waiting until there are no data readers, said data writer acquiring a lock on said shared data, said lock being different from said writer flag; and
said data writer accessing said shared data.

* * * * *